United States Patent
Mc Arthy et al.

(10) Patent No.: US 6,938,877 B2
(45) Date of Patent: Sep. 6, 2005

(54) VALVE STEM SEAL ASSEMBLY

(75) Inventors: Troy D. Mc Arthy, Auburn, IN (US);
Timothy A. Hegemier, Avilla, IN (US)

(73) Assignee: Dana Corporation, Toledo, OH (US)

( * ) Notice: Subject to any disclaimer, the term of this patent is extended or adjusted under 35 U.S.C. 154(b) by 132 days.

(21) Appl. No.: 10/612,454

(22) Filed: Jul. 2, 2003

(65) Prior Publication Data

US 2005/0001196 A1 Jan. 6, 2005

(51) Int. Cl.⁷ .................................................. F01L 3/08
(52) U.S. Cl. .................. 251/214; 123/188.6; 123/188.9
(58) Field of Search ....................... 251/214; 123/188.5, 123/188.6, 188.9

(56) References Cited

U.S. PATENT DOCUMENTS

| | | | |
|---|---|---|---|
| 3,333,578 A | 8/1967 | Muller | |
| 4,695,061 A | 9/1987 | Meisner et al. | |
| 4,909,202 A | 3/1990 | Binford et al. | |
| 5,072,950 A | 12/1991 | Littleproud et al. | |
| 5,174,256 A | 12/1992 | Binford | |
| 5,553,869 A | 9/1996 | Stamback | |
| 5,558,056 A | 9/1996 | Sakata | |
| 6,209,504 B1 | 4/2001 | Hegemier et al. | |
| 6,609,700 B2 * | 8/2003 | Leimer | 251/214 |

* cited by examiner

*Primary Examiner*—J. Casimer Jacyna
(74) *Attorney, Agent, or Firm*—Rader, Fishman & Grauer PLLC

(57) ABSTRACT

A valve stem seal assembly includes a retainer and a sealing element disposed within the retainer. The retainer includes a step and one or more installation pads. The sealing element includes a first sealing lip for sealing a valve stem, and a second sealing lip for sealing a chamfer of a valve guide. The step of the retainer exerts a compression force, F, against the second sealing lip to seal the second sealing lip against the chamber of the valve guide. The one or more installation pads exerts a frictional force against the valve guide to prevent movement of said valve stem seal assembly. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims. 37 CFR 1.72(b).

7 Claims, 2 Drawing Sheets

VALVE STEM SEAL ASSEMBLY

TECHNICAL FIELD

The present invention relates to a valve stem seal assembly, and in particular to a valve stem seal assembly with a sealing element for sealing the valve guide chamfer.

BACKGROUND OF THE INVENTION

Those skilled in the art will appreciate the manner in which intake and exhaust valves are employed in cylinder heads of internal combustion engines. In conventional overhead valve internal combustion engines, a pair of valves reciprocates in timed alternation to provide intermittent communication between the intake and exhaust manifolds and a combustion chamber. As is well known, the intake port of a combustion chamber is opened and closed by the reciprocating motion of at least one intake valve. The intake valve permits fuel mixed with air to flow into the combustion chamber. In addition, an internal combustion engine has at least one exhaust valve and associated exhaust port for releasing expended combustion gases into the atmosphere. Lubrication is provided to the upper portions of the valves. Because temperatures in the combustion chamber may approach or exceed 1000 degrees Centigrade, any lubricating oil exposed to these temperatures will vaporize or burn leaving behind deposits that may interfere with the proper sealing of the valves and cause rapid deterioration. Also, excessive burned or unburned oil in the exhaust stream may worsen engine exhaust emissions. Valve stem seal assemblies are used to seal against leakage of oil between each valve guide and its associated valve stem.

It is therefore necessary to provide seals around the upper region of the valve stems and along the valve guide down to the manifolds and combustion chamber. A typical valve stem seal takes the form of a cylinder partially closed at one end by the valve seal. The cylindrical region seats about the valve guide to maintain the valve seal stationary. An upper region of the valve stem is surrounded by the valve seal when the valve stem is fully inserted into the valve seal assembly.

Conventional valve seal assemblies comprise two primary parts; 1) an elastomeric oil seal positioned at one end to control leakage of oil between the valve stem and guide, and 2) a structural cylindrical part called a retainer which is mounted either atop of or around the valve guide. The seal assembly is frictionally secured to the valve guide. Restrictions in the geometry of engines sometimes do not allow enough axial (vertical) clearance to properly design a top-sealing valve stem seal assembly nor do they allow enough radial (horizontal) clearance to design a valve stem seal assembly that properly seals around the guide.

SUMMARY OF THE INVENTION

The inventors of the present invention have recognized these and other problems associated with valve stem seal assemblies. To this end, the inventor has developed a valve stem seal assembly for sealing a valve stem and valve guide having a chamfer. The valve stem seal assembly comprises a retainer including a step, and a sealing element disposed within the retainer and having a first portion with a first sealing lip for sealing a valve stem, and a second portion with a second sealing lip for sealing a chamfer of a valve guide, wherein the step exerts a compression force, F, against the second sealing lip, thereby sealing the second sealing lip against the chamfer of the valve guide.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
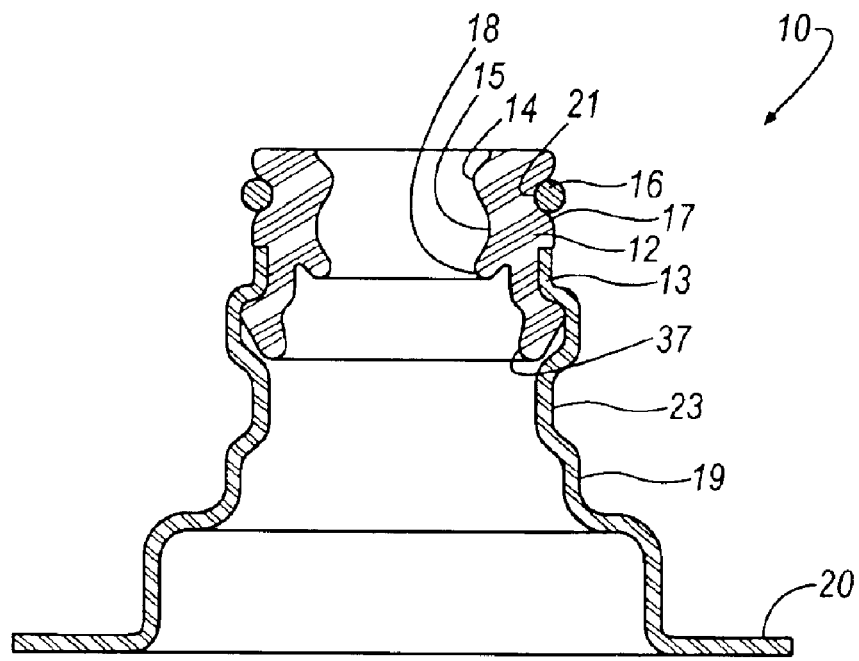
FIG. 1 is a cross-sectional view of a valve stem seal assembly with an elastomeric valve stem seal constructed in accordance with an embodiment of the invention.

Referring initially to FIG. 1, a valve stem seal assembly 10 incorporates an elastomeric valve sealing element or valve stem seal 12 affixed or otherwise assembled to a cylindrical retainer 19. The sealing element 12 may be affixed to the retainer 19, for example, an end wall 13 of the retainer 19 by bonding, or the like. Although the invention contemplates that the retainer 19 is formed of metal, other materials may be suitable depending upon the harshness of the particular environment. For example, some glass-filled nylons or other plastics may be suitable for some engine environments, wherein in such cases the retainer might suitably be formed of plastic materials.

The sealing element 12 has a generally cylindrical body that includes interior and exterior surfaces 15 and 17, respectively. The sealing element 12 is supported in the end wall 13 by means of an exterior groove 21 formed in the exterior surface 17 of the sealing element 12. The interior surface 15 of the top portion of the sealing element 12 contains an oil sealing lip 14 adapted for contact with the cylindrical surface of a valve stem 34. The top portion of the sealing element 12 may also include a second oil sealing lip 18 longitudinally spaced from the lip 14 adapted for contact with the valve stem 34 and positioned proximally to the interface between the valve stem 34 and a valve guide 30. Those skilled in the art will appreciate that the second oil sealing lip 18 is not required in all applications. Whether or not present, however, those skilled in the art will also appreciate that the lip 14 (and second oil sealing lip 18) are sized to assure proper lubrication and consequent avoidance of premature damage to the lip 14 (and second oil sealing lip 18) due to friction, as well as any frictional scouring of the valve stem 34.

Figure 2:
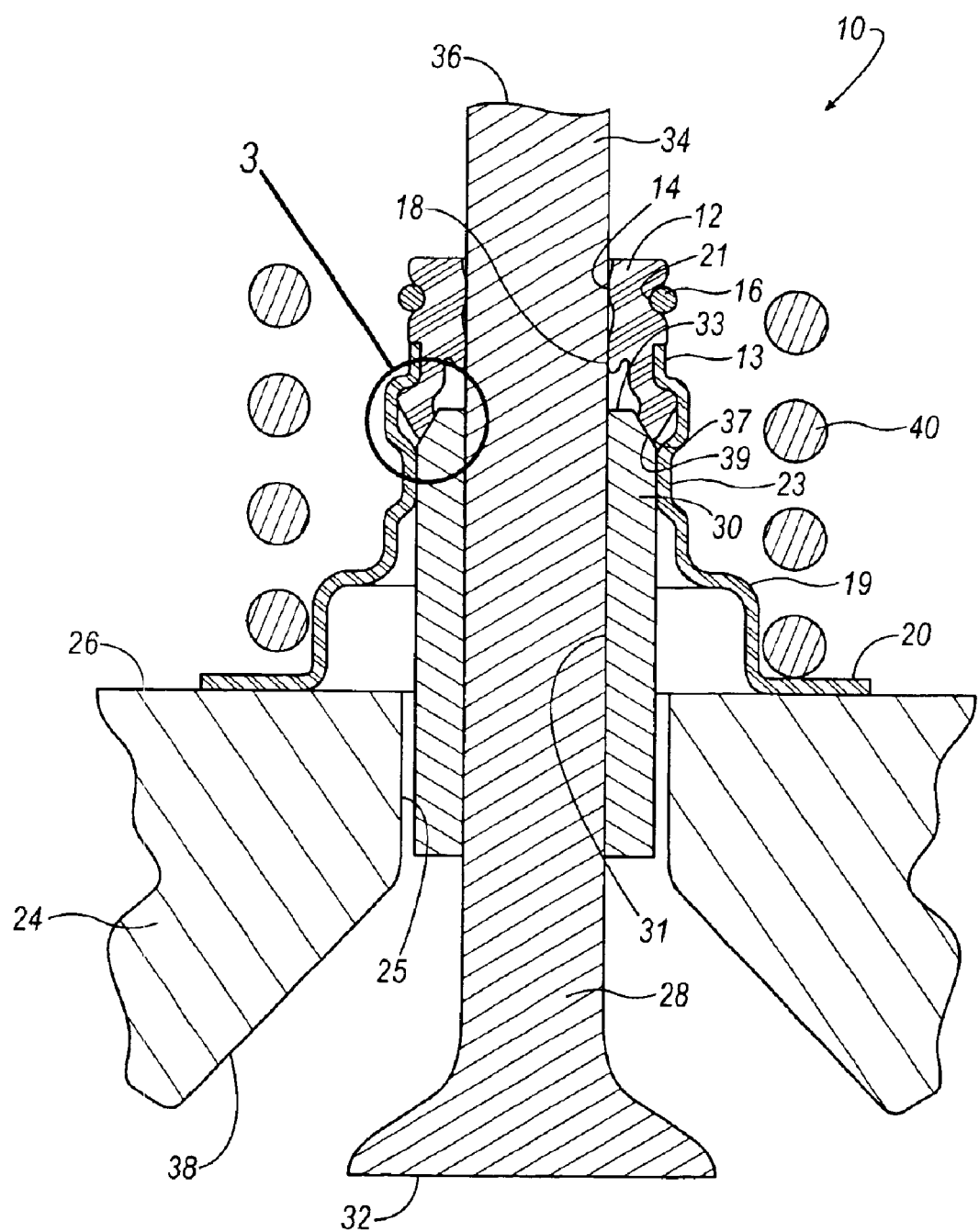
FIG. 2 is a cross-sectional view of the valve stem seal assembly of FIG. 1 installed over a valve guide of an internal combustion engine, wherein the elastomeric valve stem seal with sealing element of the invention is shown engaging the chamfer of the valve guide.

Referring now also to FIG. 2, the described valve stem seal assembly 10 is shown installed in an engine. As depicted, the seal assembly is installed over, and is thus frictionally secured to, an annular valve guide 30 by one or more installation pads 23 of the retainer 19 frictionally engaging the valve guide 30. It will be apparent that the valve stem assembly 10 is actually installed over that portion of the valve guide 30 that protrudes above the deck 26 of the cylinder head 24. The stem 34 of a valve 28 is designed to reciprocate within an aperture 31 that extends through the interior of the valve guide 30.

The operation of the valve stem seal assembly 10 and associated valve 28 may now be described as follows. During the operation of an engine (not shown), the combustion process occurs in rapid cyclic fashion. The valve head 32 is designed to open and close an intake (or exhaust) valve port 38 at a rate of several times per second. A cam on a camshaft (neither shown) urges a cam actuated free end 36 of the valve stem 34 downwardly in a reciprocal or cyclic manner against the constant force of a valve return spring 40 disposed about the retainer 19. In accordance with FIG. 2, it will be appreciated that the return spring 40 bears against the upper surface of an optional bottom flange 20.

To the extent that the combustion process occurs inside of the cylinder head 24, for example, under the cylinder head deck 26, the valve head 32 is positioned nearest the combustion process. An oily environment exists above the cylinder head deck 26, or one subject to "splash and spray oil," as described in the art. As a result, a valve stem seal assembly 10 is needed to assure that oil does not migrate into the area under the valve head 32 and into the combustion chamber (not shown).

One migration path along which oil may travel into the combustion chamber extends between the valve stem 34 and the elastomeric sealing element 12. As earlier noted, the annular valve stem sealing lip 14 is the primary gate for deterring oil travel along this migration path. A garter spring or wire ring 16 is disposed in the exterior groove 21 of the sealing element 12, circumferentially tensioning the lip 14 against the stem 34 to compensate for wear of the lip 14 over the useful life of the seal assembly 10. In addition, the sealing lip 18 may be included to prevent oil flow migration past the top surface 33 of the valve guide 30, and down along a path between the valve stem 34 and the valve stem seal assembly 10.

Figure 3:
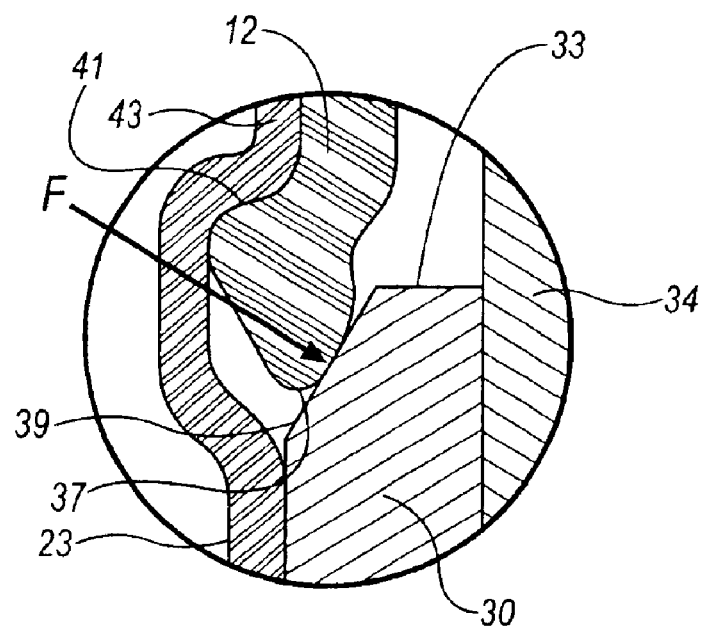
FIG. 3 is an enlarged view of FIG. 2 showing the elastomeric valve stem seal with sealing element of the invention engaging the chamfer of the valve guide.

One aspect of the invention is that the bottom portion of the sealing element 12 includes a third sealing lip 37 adapted for contact with a chamfer 39 of the valve guide 30 that prevents oil flow migration past the top surface 33 of the valve guide 30. As best seen in FIG. 3, a step 43 of the retainer 19 bears against an upper portion 41 of the sealing lip 37 and exerts a compressive force, F, on the sealing lip 37. Preferably, the compressive force, F, is substantially perpendicular to surface of the chamfer 39. Optionally, the upper portion 41 of the sealing lip 37 can be affixed, bonded or the like to the step 43 of the retainer 19. By utilizing the compressive force, F, exerted by step 43 against the sealing lip 37, the sealing lip 37 provides an effective seal against the chamfer 39 of the valve guide 30. In addition, the frictional force exerted by the installation pad 23 of the retainer 19 against the valve guide 30 resists vertical movement of the valve stem seal assembly 10, thereby maintaining the effective seal provided by the sealing lip 37 against the chamfer 39 of the valve guide 30.

Unlike conventional valve stem seal assemblies that seal against the vertical, cylindrical face of the valve guide or seal against the horizontal top surface of the valve guide, the present invention provides for a lower seal specifically designed to seal against the chamfer of the valve guide. As a result, the valve stem seal assembly 10 can be used where geometry considerations prevent the use of both vertical and horizontal sealing valve stem seal assemblies.

It should be understood that the aforementioned and other various alternatives to the embodiments of the invention described herein may be employed in practicing the invention. It is intended that the following claims define the scope of the invention and that the method and apparatus within the scope of these claims and their equivalents be covered thereby.

What is claimed is:

1. A valve stem seal assembly for sealing a valve stem and valve guide having a chamfer, said valve stem seal assembly comprising:
   a retainer including a step; and
   a sealing element disposed within the retainer and having a first portion with a first sealing lip for sealing a valve stem, and a second portion with a second sealing lip for sealing a chamfer of a valve guide,
   wherein the step exerts a compression force substantially perpendicular to a surface of the chamfer, F, against the second sealing lip, thereby sealing the second sealing lip against the chamfer of the valve guide.

2. The valve stem seal assembly according to claim 1, wherein the retainer includes one or more installation pads for providing a frictional force against the valve guide to prevent vertical movement of said valve stem seal assembly.

3. The valve stem seal assembly according to claim 1, wherein said valve stem seal is bonded to said retainer.

4. The valve stem seal assembly according to claim 1, wherein said sealing element is made of an elastomeric material.

5. A valve stem seal assembly for sealing a valve stem and valve guide having a chamfer, said valve stem seal assembly comprising:
   a retainer including a step and one or more installation pads; and
   a valve stem seal disposed within the retainer and having a first portion with a first sealing lip for sealing a valve stem, and a second portion with a second sealing lip for sealing a chamfer of a valve guide.
   wherein the step of the retainer exerts a compression force substantially perpendicular to a surface of the chamfer, F, against the second sealing lip to seal the second sealing lip against the chamber of the valve guide, and
   wherein the one or more installation pads exerts a frictional force against the valve guide to prevent movement of said valve stem seal assembly.

6. The valve stem seal assembly according to claim 5, wherein said valve stem seal is bonded to said retainer.

7. The valve stem seal assembly according to claim 5, wherein said sealing element is made of an elastomeric material.

* * * * *